United States Patent [19]

Wilson et al.

[11] Patent Number: 5,367,347
[45] Date of Patent: Nov. 22, 1994

[54] RETAINER STRAP FOR EYEGLASSES

[76] Inventors: William M. Wilson, P.O. Box 540713, Dallas, Tex. 75220; Stevan M. Waller, 3221 Harvard St. N., Irving, Tex. 75062

[21] Appl. No.: 98,717
[22] Filed: Jul. 29, 1993
[51] Int. Cl.⁵ .............................................. G02C 3/00
[52] U.S. Cl. .................................... 351/156; 351/157; 24/3 C
[58] Field of Search ............... 24/3 C, 3 B; 2/10, 11, 2/452; 351/41, 111, 122, 123, 130, 133, 155, 156, 157, 158

[56] References Cited

U.S. PATENT DOCUMENTS

| | | | |
|---|---|---|---|
| 2,648,255 | 8/1953 | Pendleton | 351/157 |
| 2,819,650 | 1/1958 | Seron | 351/156 |
| 3,957,361 | 5/1976 | Buccicone | 351/123 |
| 4,479,703 | 10/1984 | Enghofer | 351/123 |
| 4,549,793 | 10/1985 | Yoon | 351/156 |
| 4,692,002 | 9/1987 | Meistrell | 351/156 |
| 4,696,556 | 9/1987 | Perry, III | 351/157 |
| 4,743,105 | 5/1988 | Tabacchi | 351/156 |
| 4,783,164 | 11/1988 | Heiberger | 351/156 |
| 4,790,646 | 12/1988 | Seron | 351/157 |
| 4,818,094 | 4/1989 | Lyons | 351/157 |
| 4,820,036 | 4/1989 | Seet | 351/156 |
| 4,881,803 | 11/1989 | Giles et al. | 351/156 |
| 4,974,956 | 12/1990 | Gill | 351/156 |
| 4,976,531 | 12/1990 | Kahaney | 351/156 |
| 5,032,018 | 7/1991 | McCulley et al. | 351/156 |
| 5,074,656 | 12/1991 | Parrish | 351/156 |
| 5,092,668 | 3/1992 | Welch et al. | 351/156 |
| 5,157,425 | 10/1992 | Liu | 351/156 |
| 5,201,856 | 4/1993 | Edwards | 351/156 |

FOREIGN PATENT DOCUMENTS 2249191 4/1992 United Kingdom ............... 351/157

Primary Examiner—William L. Sikes
Assistant Examiner—David R. Parsons
Attorney, Agent, or Firm—Timmons & Kelly

[57] ABSTRACT

An elongated band has an end piece on said end. Each end piece is made of a resilient material and has a slit extending through the end piece for receiving a temple bow of the eyeglasses. A pair of anti-splitting holes extend through the end piece, along each side of the slit, for preventing splitting of the end piece along the slit.

7 Claims, 2 Drawing Sheets

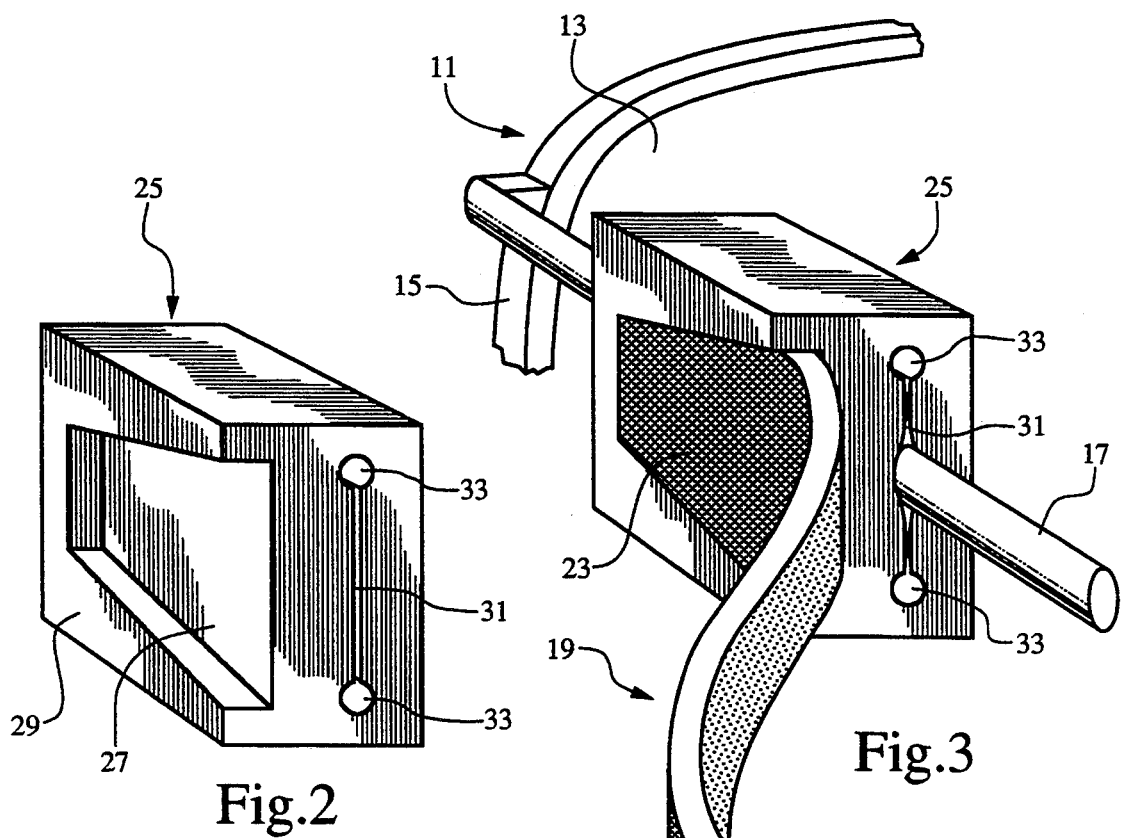
Fig.2
Fig.3
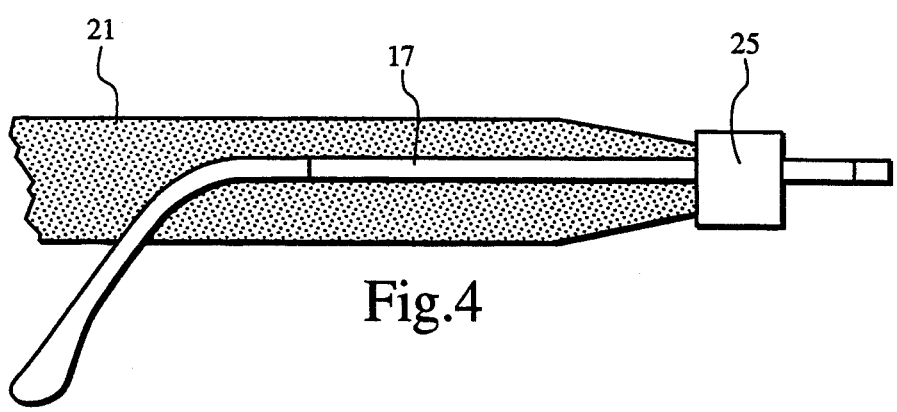
Fig.4

RETAINER STRAP FOR EYEGLASSES

BACKGROUND OF THE INVENTION

1. Field of the Invention

This invention relates in general to spectacles or eyeglasses. In particular, the invention relates to eyeglasses having a retainer strap for securing the eyeglasses to the wearer's head.

2. Description of Related Art

When a person is playing sports and must wear eyeglasses or sun shades, the eyeglasses or shades must be held securely in place. In some cases, an eyeglasses retainer strap is used to hold the eyeglasses tightly to the wearer's face.

In most cases, a retainer strap is an elongated band, with each end of the band attached to one of the temple bows. Some retainers are adjustable by changing the length of the strap. Unfortunately, it is sometimes difficult to adjust the length of the band.

Other retainer straps are adjustable by changing the point at which the end of the band is attached to the temple bow. However, it has been difficult to make a strap that can be easily adjusted along the temple bow and yet will remain in place during use.

SUMMARY OF THE INVENTION

One object of the invention is to retain a pair of eyeglasses on a person's face, while being easily adjustable. The retainer strap of the invention is an elongated band, having an end piece on each end. Each end piece is made of a resilient material and has a slit extending through the end piece for receiving a temple bow of the eyeglasses.

Each end piece also has a pair of anti-splitting holes. The anti-splitting holes extend through the end piece, along both sides of the slit, for preventing splitting of the end piece along the slit.

The end of the band exerts a rearward force on one side of the end piece, causing a torque on the end piece. The torque on the end piece tightens the grip of the end piece on the temple bow.

The above, as well as additional objects, features, and advantages of the invention will become apparent in the following detailed description.

BRIEF DESCRIPTION OF THE DRAWINGS

FIG. 2 is a close-up perspective view of one of the end pieces.

FIG. 3 is a perspective view of a portion of the retainer strap, showing one of the end pieces and one end of the band, installed on a typical pair of eyeglasses.

FIG. 4 is a side elevation of one of the end pieces and one end of the band, attached to one of the temple bows of a typical pair of eyeglasses.

DESCRIPTION OF THE PREFERRED EMBODIMENT

Figure 1:
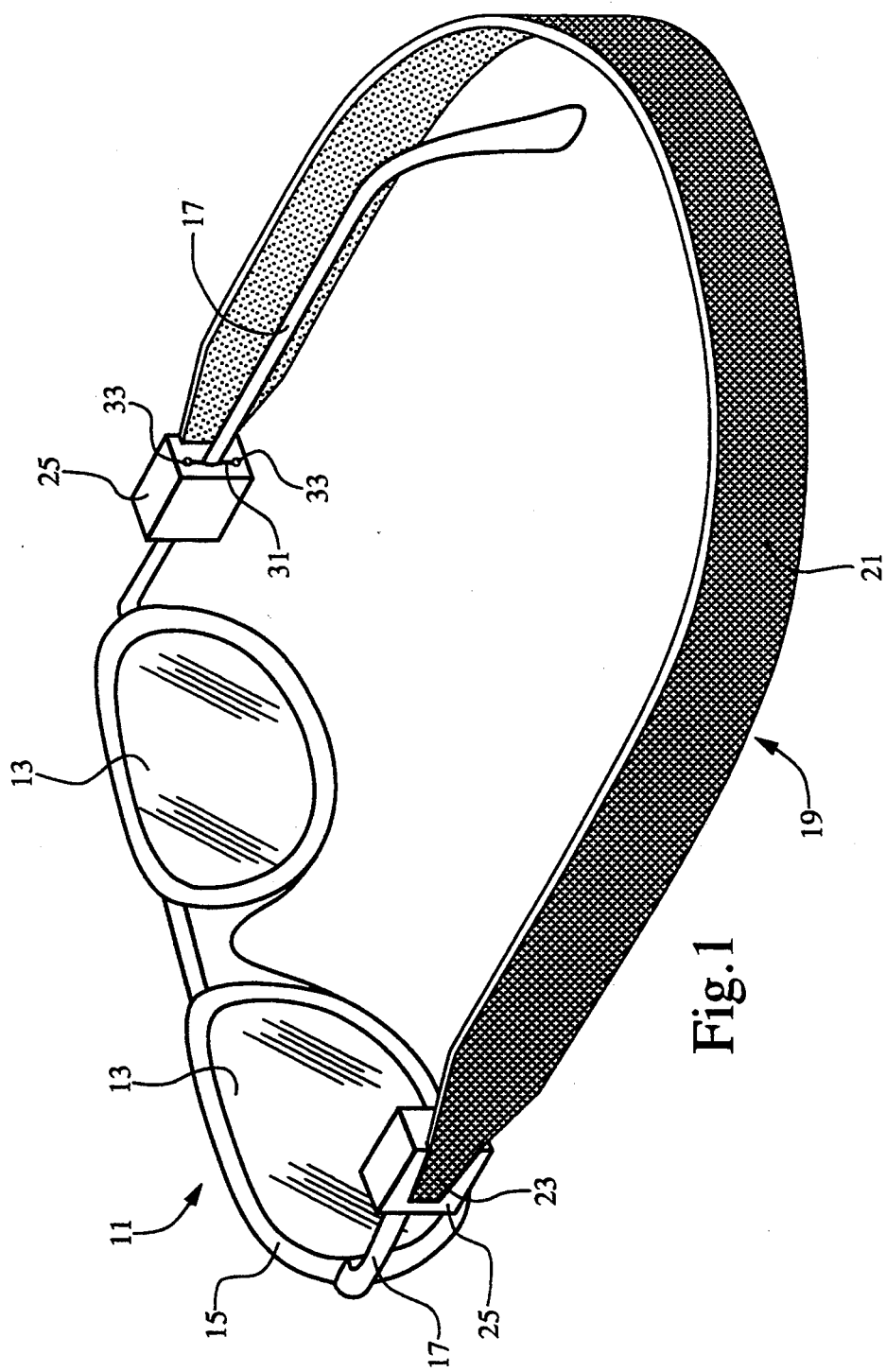
FIG. 1 is a perspective view of a retainer strap, according to the invention, installed on a typical pair of eyeglasses.

The standard pair of eyeglasses 11 or sun shades has a pair of lens 13 held by a frame 15. A pair of temple bows 17 extend from the frame 15 rearward over the wearer's ears. Temple bows 17 are generally rather thin, but may vary according to fashion. Some temple bows 17 may be as much as ten millimeters wide.

The retainer strap 19 of the invention includes an elongated band 21, made of a stretchable material or neoprene. The band 21 may be approximately 25 centimeters long, and about 18 millimeters wide. The band 21 has two ends 23, and each end 23 of the band 21 tapers down from 14 millimeters wide to about sic millimeters wide. The tapered portion of each end 23 of the band 21 is about 25 millimeters long.

Each end 23 of the band 21 is attached to an end piece 25. Each end piece 25 is generally a parallelepiped, about 9 millimeters wide, 14 millimeters tall, and 10 millimeters long. The end pieces 25 are made of a resilient, rubber-like material.

Each end piece 25 has a recess 27 on its outer face 29. The recesses 27 are trapezoidal, tapering down from 10 millimeters to 6 millimeters from rear to front. The recesses 27 are a constant three millimeters deep. The ends 23 of the band 21 fit neatly within the trapezoidal recesses 27 and are secured with glue or another adhesive.

Each end piece 25 also has a flat slit 31 extending through the end piece 25 from front to rear. The slits 31 are 10 millimeters wide and the resiliency of the end pieces 25 allows the slits 31 to open wide enough to receive the temple bows 17.

An anti-splitting hole 33 extends through each end piece 25, from front to rear, along each end of each slit 31. The anti-splitting holes 33 are one millimeter in diameter, and help keep the end pieces 25 from splitting along the slits 31.

In use, the retainer strap 19 of the invention is installed on a pair of glasses 11 by inserting the temple bows 17 through the slits 31 in the end pieces 25. Each end piece 25 is moved to a selected location on the temple bow 17 and released. The slit 31 will tend to close on and grasp the temple bow 17.

The elongated band 21 is then placed over the back of the wearer's head as the glasses are put on. The tension of the band 21 on the end pieces 25 places a torque on the end pieces 25 to further strengthen the grip of the end pieces 25 on the temple bows 17.

The invention has several advantages over the prior art. The retainer strap is easy to install and to adjust, and yet the end pieces 25 will not easily slip along the temple bows 17.

The invention has been described in only one embodiment. It should be apparent to those skilled in the art that the invention is not so limited, but is susceptible to various changes and modifications without departing from the spirit of the invention.

I claim:

1. A retainer strap for eyeglasses having a pair of temple bows, comprising:
   an elongated band, having two ends; and
   a pair of end pieces, one end piece being attached to each end of the band, wherein each end piece is made of a resilient material and has a slit extending through the end piece for receiving a temple bow of the eyeglasses, wherein the slit in each end piece has two sides, and wherein each of the end pieces has an anti-splitting hole extending through the end piece, along one end of the slit, for preventing splitting of the end piece along the slit.

2. A retainer strap, as recited in claim 1, wherein each of the end pieces also has a second anti-splitting hole extending through the end piece, along the other end of the slit.

3. A retainer strap, as recited in claim 2, wherein each end piece has a recessed area to which one end of the elongated band is attached.

4. A retainer strap, as recited in claim 3, wherein the recessed area in each end piece is trapezoidal.

5. A retainer strap, as recited in claim 4, wherein each end of the elongated band is attached to one of the end pieces with an adhesive.

6. A retainer strap for eyeglasses having a pair of temple bows, comprising:
   an elongated band, having two ends; and
   a pair of end pieces, one end piece being attached to each end of the band with an adhesive, wherein each end piece is made of a resilient material and has a slit extending through the end piece for receiving a temple bow of the eyeglasses, wherein each end piece has a trapezoidal recessed area to which one end of the elongated band is attached, and wherein the slit in each end piece has two sides, and wherein each of the end pieces has an anti-splitting hole extending through the end piece, along one end of the slit, for preventing splitting of the end piece along the slit.

7. A retainer strap, as recited in claim 6, wherein each of the end pieces also has a second anti-splitting hole extending through the end piece, along the other end of the slit.

* * * * *